United States Patent [19]

Hikami et al.

[11] Patent Number: 5,506,721
[45] Date of Patent: Apr. 9, 1996

[54] EXTERNAL MODULATOR FOR OPTICAL COMMUNICATION

[75] Inventors: Toshiya Hikami, Yokohama; Shoichi Negami; Matsue Murata, both of Hiratsuka; Shigeaki Nishikawa, Yokohama; Hiromi Ogawa, Kashima, all of Japan

[73] Assignee: The Furukawa Electric Co., Ltd., Tokyo, Japan

[21] Appl. No.: 170,346

[22] PCT Filed: Feb. 5, 1993

[86] PCT No.: PCT/JP93/00148

§ 371 Date: Dec. 23, 1993

§ 102(e) Date: Dec. 23, 1993

[87] PCT Pub. No.: WO93/22706

PCT Pub. Date: Nov. 11, 1993

[30] Foreign Application Priority Data

Apr. 28, 1992 [JP] Japan .................... 4-136078
Sep. 28, 1992 [JP] Japan .................... 4-281054

[51] Int. Cl.$^6$ .................................... G02F 1/11
[52] U.S. Cl. ................... 359/285; 385/2; 385/13
[58] Field of Search .................. 359/313, 305, 359/314, 285, 286, 287, 323; 385/2, 3, 7, 8, 13

[56] References Cited

U.S. PATENT DOCUMENTS 3,771,856  11/1973  Eschler .................... 350/161
4,703,287  11/1973  Fournier, Jr. et al. ........ 332/7.51

FOREIGN PATENT DOCUMENTS 0178045    4/1986  European Pat. Off. .
48-90253   11/1973  Japan .
51-136431  11/1976  Japan .
52-41541    3/1977  Japan .
53-90950    8/1978  Japan .
56-128145  10/1981  Japan .
59-19922    2/1984  Japan .

OTHER PUBLICATIONS

Conference on Lasers and Electro-Optics, Jun. 1986, San Francisco, California, pp. 292–293, S. S. Tarng et al., "Acoustooptic Modulators for Single–Mode Fibers".

Journal of the Institution of Electronic and Radio Engineers, vol. 58, No. 5, Jul., 1988, London, England, pp. 566–578, M. J. F. Digonnet, et al., "Single–Mode Fibre–Optic Components".

Paper entitled "All–Fiber Acoutso–Optic Phase Modulators Using Zinc Oxide Films on Glass Fiber", A. A. Godil, et al., presented at the Optical Fiber Sensors Topical Meeting, Jan. 27–29, 1988, New Orleans, Louisana, and printed in 'Optical Fiber Sensors', 1988, Technical Digest Series, vol. Part 1, Optical Society of America, Wash. D.C. pp. 159–162.

Article Entitled "Acousto–Optic Phase Modulator for Single Mode Optical Fiber", H. F. Taylor, Navy Technical Disclosure Bulletin, vol. II, No. 2, Dec. 1985, (List continued on next page.)

Primary Examiner—Georgia Y. Epps
Assistant Examiner—Dawn-Marie Bey
Attorney, Agent, or Firm—Frishauf, Holtz, Goodman, Langer & Chick

[57] ABSTRACT

In an external modulator for optical communication, a piezoelectric element section is formed by laminating a lower electrode, a piezoelectric thin film and an upper electrode in this order on one surface of a substantially flat substrate which has substantially the same acoustic impedance as the clad layer of a single mode optical fiber to be disposed on the substrate. At least one single mode optical fiber is disposed on the other surface of the substrate on the upper electrode, and the single mode optical fiber is at least partly coated with a material having an acoustic impedance substantially equal to that of the clad layer in a place in which the single mode optical fiber is disposed.

16 Claims, 14 Drawing Sheets

OTHER PUBLICATIONS

Navy Tech. Cat. No. 4900, Case No. 68094, pp. 65–70.

Article entitled "Phase Shift Nonlinearity at Resonance in a Piezofilm–Based Fiber–Optic Phase Modulator", V. S. Sudarshanam, et al., Journal of Applied Physics 68 (1990) Sep., No. 5, New York,, N.Y. pp. 1975–1980.

Article entitled "AO Phase Modulator for Single–Mode Fibers Using Cylindrical ZnO Transducers" by D. S. Czaplak, et al., Naval Research Laboratory, 1987 Ultrasonics Symposium, IEEE Research Laboratory, Wash. D.C., pp. 491–493.

Article entitled "All–Fiber Acoustooptic Phase Modulators Using Zinc Oxide Films on Glass Fiber", A. A. Godil, et al, Journal of Lightwave Technology, vol. 6, No. 10, Oct., 1988, IEEE, pp. 1586–1590.

Article entitled "Detachable 400–MHZ Acousto–Optic Phase Modulator for A Single–Mode Optical Fiber", D. B. Patterson, Received Sep. 8, 1988 and accepted Nov. 30, 1988, Published in Optics Letters, vol. 14, No. 4, Feb. 15, 1989 Optical Society of America, Washington, D.C., pp. 248–250.

D. S. Czaplak; AO Phase Modulator for Single–Mode Fibers Using Cylindrical ZnO Transducers; 1987; pp. 491–493; IEEE.

A. A. Godil; All–Fiber Acoustooptic Phase Modulators Using Zinc Oxide Films on Glass Fiber; 1988; pp. 1586–1590; IEEE.

D. B. Patterson; Detachable 400–MHz Acousto–optic Phase Modulator For A Single–mode Optical Fiber; 1989; pp. 248–250; Optics Letters.

EXTERNAL MODULATOR FOR OPTICAL COMMUNICATION

TECHNICAL FIELD

This invention relates to an external modulator for optical communication for applying a modulation signal to an optical fiber from the exterior and thereby indirectly modifying a light propagating in the optical fiber, and more particularly to an external modulator for optical communication which can be easily manufactured, which can suppress the resonance of elastic waves in the optical fiber, which has a small insertion loss so that a large number of external modulators can be connected to a single transmission line, which has a flat frequency characteristic, and which can be used for high frequency modulation.

BACKGROUND ART

Conventionally, most of the modulators incorporated in an optical communication system generally utilize a direct modulation system for changing an application current to a semiconductor laser or light emitting diode which is a light source and directly modulating an output light therefrom.

However, in the case of this system, there is a problem that the light property is made unstable according to the modulation of the intensity in an LD (laser diode) generally used as a light source and the transmission distance of an optical signal is considerably limited.

Further, in this system, one signal source (signal transmission source) is used as to correspond to one transmission line, it becomes necessary to insert an optical coupler between the individual signal source and the transmission line in order to couple optical signals composed of a plurality of signal sources into one transmission line.

However, in the above direct modulation system, an insertion loss caused by the insertion of the optical coupler is large. For example, even in a case of a waveguide type optical coupler whose insertion loss is said to be relatively small, it is approx. 0.5 dB. Therefore, the number of signals which can be coupled to one transmission line is limited.

In order to overcome the above limitation in the direct modulation system, recently, a modulator utilizing an external modulation system is developed.

The external modulation system is a system having a D.C. light source whose intensity is constant with time, and modulating a propagation light by use of a modulator arranged on a half-way of the optical transmission line and can exclude obstacles based on instability of the light source. Further, it has an advantage that the insertion loss caused when the modulator is inserted to the optical transmission line is small, and therefore, a large number of modulators can be incorporated into the optical transmission line.

As a modulator incorporated into an optical communication system of the above external modulation system, the following examples are known as representative examples.

One of them is obtained by forming a waveguide pattern having a large refractive index in a substrate made of $LiNbO_3$ by ion exchanging operation, for example, and disposing an electrode for voltage application near the waveguide.

The external modulator is operated on the basis of the electrooptic effect, and the modulation characteristic in the high frequency region (several GHz) is excellent, but the dependency thereof on variations in the temperature and moisture is large, the dependency of the light output intensity on the bias voltage fluctuates according to deterioration with time and expansion/contraction of the waveguide base plate caused by the above variations, thus providing a problem that it is difficult to attain the stable operation. Further, since the single crystal of $LiNbO_3$ is extremely expensive and has a difficulty in the practical application in the industry. In the case of this modulator, the insertion loss is as large as 2 to 4 dB, and therefore, it is difficult to dispose a large number of modulators in one optical transmission line.

Further, there is provided such a type as shown in FIG. 1 and disclosed by D. S. Czaplak and F. S. Hickernell in Ultrasonics Symposium, 1987, pp 491 to 493. The external modulator has such a structure that the outer periphery of a clad layer 1a of a single mode optical fiber 1 is covered with a lower electrode which is formed of a Cr—Au thin film, a thin film 3 formed of ZnO which is a piezoelectric material and an upper electrode 4 which is formed of a Cr—Au thin film.

Further, Godil et al. proposed a structure constructed by laminating a lower electrode 2 formed of Cu/Au and a piezoelectric thin film 3 formed of ZnO, sequentially and partially on a half-portion of the periphery of the optical fiber as shown in FIG. 2 in J. Lightwave Technol vol. 6, 1586, 1988. In the case of the above external modulator, an unnecessary resonance mode of elastic waves can be suppressed not by orientating the stress of the elastic waves concentrated on a core 1b of the optical fiber symmetrically with respect to an axis of the optical fiber, but by orientating the same perpendicular to the axis.

In the above external modulators, since the optical fiber and the external modulating means are formed in an integral structure, there is provided an advantage that the insertion loss in the transmission line is extremely small and they can be manufactured at a low cost.

However, in the case of the above external modulators, the lower electrode, piezoelectric thin film, and upper electrode are formed by applying the vapor deposition method or sputtering method, but since the surface of the optical fiber 1 is a curved surface, it becomes necessary to rotate the optical fiber in the film forming device or use other high-degree operation technology in order to form a piezoelectric film having a uniform piezoelectric characteristic over the entire range of the circumferential direction, thus providing a problem in the manufacturing process.

Further, there is provided a problem of the characteristic that the elastic wave is considerably reflected on the periphery of the optical fiber so as to cause the resonance of the elastic wave inside the optical fiber, and as a result, the frequency characteristic of the modulator cannot be made flat.

Further, D. B. Patterson et al. made public a type as shown in FIG. 3 in Optics Letters, vol. 14, No. 4, 1989, pp. 248 to 250.

The external modulator has a structure obtained by sequentially laminating a lower electrode 2, a thin film 3 of ZnO and an upper electrode 4 in this order on one-side surface of a substrate 5 made of quartz glass, forming a groove 5a of a semi-circular cross section on another surface, and closely burying a single mode optical fiber 1 in the groove 5a.

Like the modulator proposed by Hickernell et al., the above external modulator has an advantage that since the insertion loss thereof in the transmission line becomes extremely small and the surface of the substrate 5 is flat, the film thickness control for the lower electrode. 2, piezoelectric thin film 3 and upper electrode 4 can be made easy respectively, therefor a uniform characteristic can be obtained over the entire surface.

However, in the case of the above external modulator, it is extremely difficult to work the groove 5a formed in one surface of the substrate 5 of quartz glass so as to exactly coincide with the curvature of the cross section of the single mode optical fiber 1 which is closely buried in the groove. Further, for the same reason as in the case of Hickernell and Godil, the resonance phenomenon occurs in the optical fiber and the frequency characteristic of the modulator is not made flat.

Further, since the velocities of elastic waves (sound waves) propagating in the substrate 5 and the optical fiber 1 are substantially the same, the elastic wave propagates straightforwardly at the portion of the interface between the substrate 5 and the optical fiber 1, thus making it difficult to effectively converge the elastic wave into the core of the optical fiber 1. Particularly, when the driving frequency is high, the directivity of the elastic wave generated in the piezoelectric thin film 3 is extremely sharp and the elastic wave propagates straightforwardly in the substrate 5 so that the amount of the elastic wave which converges into the core of the optical fiber 1 will be extremely limited. That is, the rate at which the elastic wave generated in the piezoelectric thin film 3 contributes to modulation of the light propagating in the optical fiber 1 is extremely small and the efficiency is lowered.

In order to improve above problems, it is effective to increase the length/width ratio of the portion functioning as the piezoelectric element so as to increase the effective length of the piezoelectric thin film for the optical fiber, but when such a process is effected, the width of the piezoelectric thin film 3 or upper electrode 4 becomes narrow so that setting of the positional relation between the piezoelectric thin film and the optical fiber will require high precision, thereby making the setting difficult.

Further, the external modulators proposed by Hickernell, Godil, Patterson have commonly the following problems described hereinafter.

First, the amplitude of the elastic wave generated in the piezoelectric thin film largely depends on the film thickness. The amplitude can be measured based on the frequency applied to the piezoelectric thin film and the S/N ratio, and the value thereof is set to the maximum value at the resonance frequency fr and considerably attenuates as the frequency is deviated from the resonance frequency fr as shown in FIG. 4 so that the bandwidth of the modulation frequency is narrowed accordingly.

Further, in the case of the above external modulators, since the piezoelectric thin film is used as a modulation medium, the piezoelectric element section constructed by the piezoelectric thin film, lower electrode and upper electrode electrically functions as a capacitor. For this reason, the impedance thereof varies with the frequency of a modulation signal from a modulation signal output section which is an information source. In order to effectively transmit the modulation signal to the piezoelectric element section, it is necessary to attain electrical matching between the modulation signal output section which is an information source and the piezoelectric element section.

The impedance variation of the piezoelectric element section based on the frequency depends on the electrical capacitance of the piezoelectric element section and the electrical capacitance largely depends on the area of the upper electrode. Therefore, the frequency band used to the above external modulators depends on the area of the upper electrode. For this reason, in the case of the external modulator having only one upper electrode, there occurs a problem that only one frequency band which is applicable can be set and the amount of information to be transmitted is reduced.

In order to solve this problem, it is considered to serially connect a plurality of external modulators to one station. In this case, when a plurality of external modulators are connected to one another by use of optical fibers, they can be easily connected by use of adapters for connectors if optical connectors are connected to both ends of the optical fiber, but in this connection system, there occurs a new problem that the insertion loss is not negligible when the number of connecting portions becomes large and a light is reflected between the connectors.

Further, if the ends of the optical fibers are connected by fusion method, the above-described problem concerning the insertion loss and reflection of light can be solved, but a problem that the handling thereof is difficult occurs.

Further, as a problem common to the above two connection systems, a problem that the occupied space of the modulation system is large occurs.

Further, there is provided a type made public by Fujisaki et al. in Institute of Electronics and Communication Engineers at National Convention, Spring, B-891, 1990. The external modulator has a structure constructed by mechanically pushing PZT piezoelectric ceramics on a coating of single mode optical fiber.

However, in this type of external modulator, since the piezoelectric element and the clad of the single mode optical fiber are not closely contacted together, the transmission efficiency of the elastic wave from the piezoelectric element to the optical fiber is degraded, and as a result, it is difficult to say that the modulation for high frequencies higher than 1 MHz can be adequately attained.

An object of this invention is to provide an external modulator for optical communication in which the insertion loss is small and which indicates a flat frequency characteristic having no special resonance peak and can attain the modulation for the high frequency such as approx. 500 MHz.

Another object of this invention is to provide an external modulator for optical communication which can be easily manufactured since the film thicknesses of the lower electrode, piezoelectric thin film and upper electrode can be easily controlled, respectively, and in which the control of orientation of the piezoelectric thin film can be easily attained and a preferable piezoelectric effect can be realized.

Still another object of this invention is to provide an external modulator for optical communication in which elastic waves generated in the piezoelectric thin film can be efficiently converged into the core of an optical fiber so as to attain an excellent modulation efficiency.

Another object of this invention is to provide an external modulator for optical communication in which the frequency characteristic of the output efficiency of elastic waves generated in the piezoelectric thin film is broad and the modulation frequency bandwidth is widened.

Still another object of this invention is to provide an external modulator for optical communication which can transmit a large amount of information with a single external modulator and the occupied space of a modulation system can be made small.

SUMMARY OF INVENTION

According to a first aspect of the invention, there is provided an external modulator for optical communication comprising:

a substrate having substantially the same acoustic impedance as a clad layer of a single mode optical fiber to be disposed;

a piezoelectric element section constructed by laminating a lower electrode, piezoelectric thin film and upper electrode in this order on one surface of the substrate;

at least one single mode optical fiber arranged on the other surface of the substrate; and a material coating the single mode optical fiber on at least part thereof in a place in which the single mode optical fiber is disposed and having an acoustic impedance which is approximately equal to that of the clad layer of the single mode optical fiber.

According to another aspect of the invention, there is provided an external modulator for optical communication comprising:

a substrate having substantially the same acoustic impedance as a clad layer of a single mode optical fiber to be disposed;

a piezoelectric element section constructed by laminating a lower electrode, piezoelectric thin film and upper electrode in this order on one surface of the substrate;

at least one single mode optical fiber arranged on the upper electrode; and a material coating the single mode optical fiber on at least part thereof in a place in which the single mode optical fiber is disposed and having an acoustic impedance which is approximately equal to that of the clad layer of the single mode optical fiber, According to still another aspect of the invention, there is provided an external modulator for optical communication comprising:

a substrate having an optical transmission line therein and formed of a material which has substantially the same acoustic impedance as the optical transmission line; and a piezoelectric element section constructed by laminating a lower electrode, piezoelectric thin film and upper electrode in this order on one surface of the substrate.

DETAILED DESCRIPTION

Figure 1:
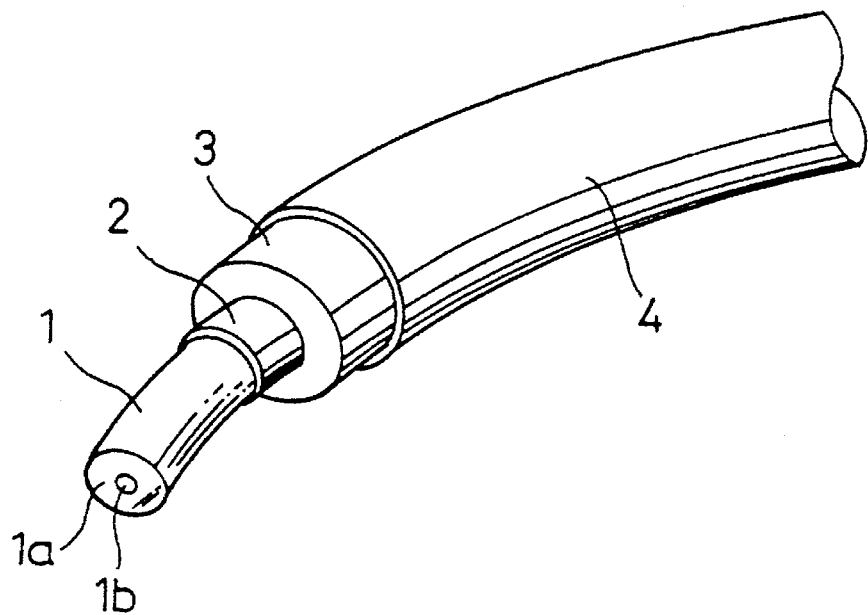
FIG. 1 is a perspective view showing a conventional case of an external modulator.
Figure 2:
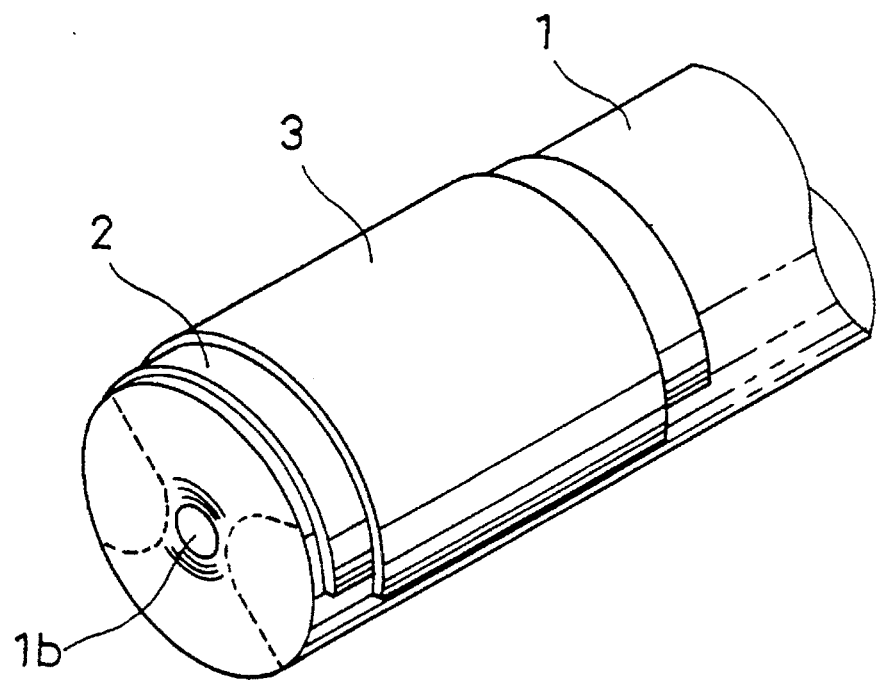
FIG. 2 is a perspective view showing another conventional case of an external modulator.
Figure 3:
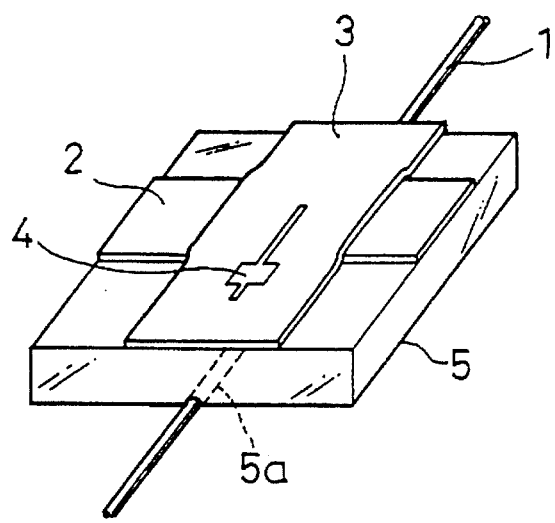
FIG. 3 is a perspective view showing another conventional case of an external modulator.
Figure 4:
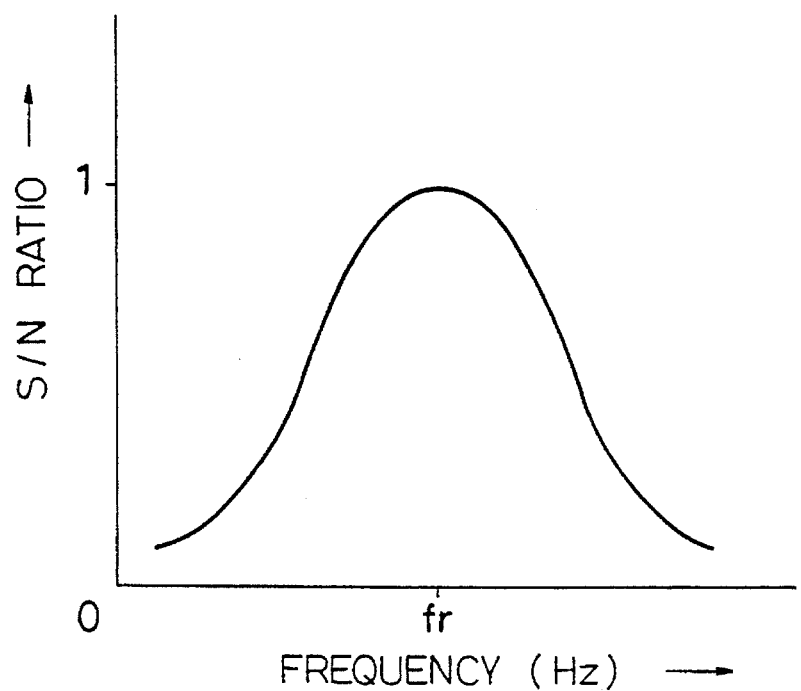
FIG. 4 is a graph showing the frequency characteristic of the conventional external modulator.
Figure 5:
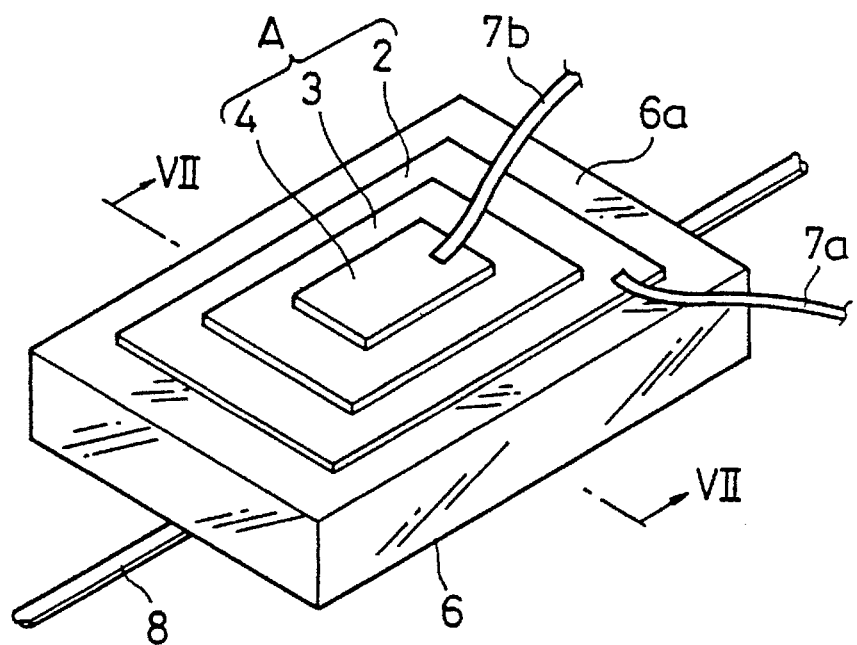
FIG. 5 is a perspective view showing the state of one surface of an external modulator of this invention.
Figure 6:
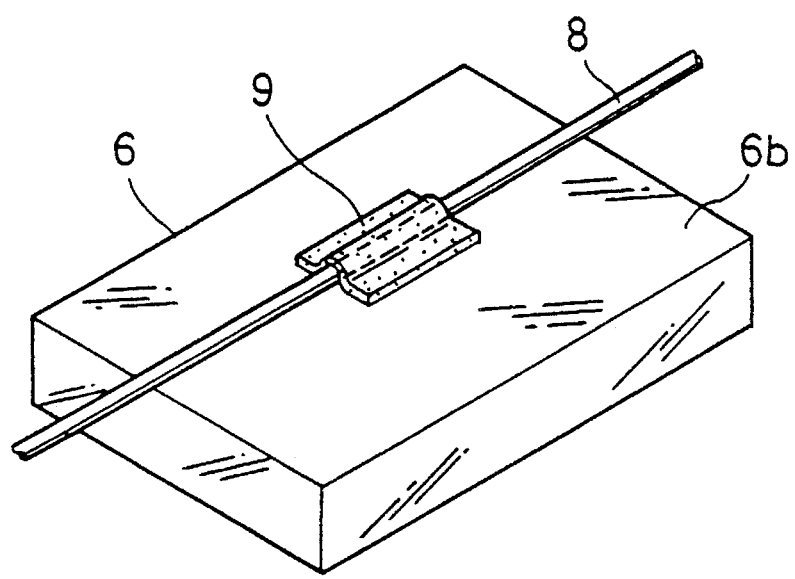
FIG. 6 is a perspective view showing the state of the other surface of the external modulator of this invention.
Figure 7:
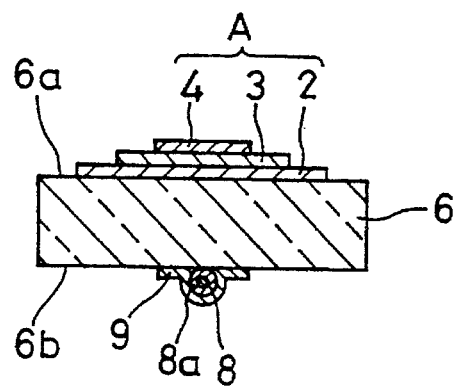
FIG. 7 is a cross sectional view taken along the line VII—VII of FIG. 5.

The above-described external modulator of the first aspect has a basic structure as shown in FIGS. 5 to 7 and the structure is constructed to have a piezoelectric element section disposed on one surface of the substrate and a single mode optical fiber disposed on the other surface thereof.

First, as shown in FIG. 5, a thin film-form lower electrode 2, a piezoelectric thin film 3 and a thin film-form upper electrode 4 are laminated in this order on one surface 6a of a flat plate-form substrate 6 formed of quartz glass and having a thickness of 1 mm, a length of 20 mm and a width of 20 mm, for example, so as to form a piezoelectric element section A and leads 7a, 7b for introducing an electrical signal for driving the piezoelectric thin film 3 are respectively attached to the lower electrode 2 and the upper electrode 4.

The material of the substrate 6 is not limited to the above-described quartz glass, but any material having substantially the same acoustic impedance as the clad layer of the single mode optical fiber disposed on the substrate can be used, and an Si substrate or sapphire substrate can be used, for example.

The material of the lower electrode 2 and upper electrode 4 is not particularly limited, but Al, Cr, Au, Cu, Au/Cr, Au/Ta, Au/Ti may be used, for example, and as the material of the piezoelectric thin film 3, LiNbO$_3$, ZnO, AlN, PVDF (polyvinylidene fluoride) can be used, for example.

The lower electrode 2, piezoelectric thin film 3 and upper electrode 4 can be formed by the known film forming method such as the sputtering method, vacuum deposition method or CVD method, for example.

At the time of film formation, since the substrate 6 is made in the plate-like form, film formation of the lower electrode 2, piezoelectric thin film 3 and upper electrode 4 on the substrate can be effected with the substrate 6 kept fixed and the control for the film thickness can be easily attained.

Therefore, it is possible to form the lower electrode 2, piezoelectric thin film 3 and upper electrode 4 whose thicknesses can be made constant over the entire surface so that the piezoelectric element section A can attain the highly reliable function. Further, the orientation of the piezoelectric thin film 3 can be easily controlled, and the piezoelectric efficiency can be enhanced by arranging the c axis of ZnO vs the position perpendicularly to the surface of the substrate 6 when forming the piezoelectric thin film by use of ZnO, for example.

As shown in FIG. 6 and FIG. 7 Which is a cross sectional view taken along the line VII—VII of FIG. 5, a single mode optical fiber 8 is disposed on the other surface 6b of the substrate 6 in the position directly below the piezoelectric thin film 3. More specifically, a desired length portion of the optical fiber 8 and the other surface 6b of the substrate are covered with a material 9 having an acoustic impedance which is close to the acoustic impedance of the clad layer 8a to fix the optical fiber 8 on the substrate 6. The acoustic impedance used here indicates the product of the density of a medium in which the elastic wave propagates and the speed of the elastic wave propagating in the medium.

In this case, all the part of the periphery of the optical fiber 8 except a portion which is in contact with the substrate 6 is coated with the material 9.

As the above material, any material having substantially the same acoustic impedance as the substrate, that is, any material having an acoustic impedance substantially equal to the acoustic impedance of the clad layer 8a of the single mode optical fiber 8 disposed can be used.

Generally, the reflection coefficient of the elastic wave (sound wave) in the interface between a medium having the acoustic impedance of $Z_1$ and a medium having the acoustic impedance of $Z_2$ can be expressed by the following expression.

$$(Z_2-Z_1)/(Z_2+Z_1)$$

Therefore, if the periphery of the single mode optical fiber is coated with the above material as described above, the acoustic impedances thereof in the interface becomes substantially equal to each other and the reflection coefficient in the interface becomes extremely small. Therefore, the propagating elastic wave can be made efficiently incident into the single mode optical fiber. Further, a returning component caused by reflection of the elastic wave transmitted in the single mode optical fiber at the optical fiber interface can be suppressed, thereby making it possible to suppress the resonance in the optical fiber.

As a material for attaining the above effect, for example, ceramics obtained by dispersing fine particles of quartz glass into sodium silicate (NaO.4SiO$_2$.aq) and sintering and vitrifying the product (acoustic impedance: $13.1 \times 10^6$ kg/(m$^2$.s)), by dispersing alumina particles into sodium silicate and sintering and vitrifying the product (acoustic impedance: $15.2 \times 10^6$ kg/(m$^2$.s)), or by dispersing zirconia particles into sodium silicate and sintering and vitrifying the product (acoustic impedance: $30.1 \times 10^6$ kg/(m$^2$.s)), or a material obtained by dispersing a preset amount of metal particles into a high molecular compound to set the inherent acoustic impedance close to that of the clad layer 8a can be used.

In the above external modulator, a light signal is transmitted from the D.C. light source to the single mode optical fiber 8 and a voltage of preset frequency is applied between the leads 7a and 7b. A periodic pressure is applied to the optical fiber 8 from the piezoelectric thin film 3 and the refraction index distribution is caused in the optical fiber 8 by the external force so as to modulate the transmission light.

At this time, since the periphery of the optical fiber 8 is covered with a material having an acoustic impedance substantially equal to that of the clad layer 8a thereof, no reflection of the sound wave propagating from the piezoelectric thin film 3 occurs on the periphery of the optical fiber 8 and it leaks into the above material, thereby preventing the resonance phenomenon from occurring in the internal portion of the optical fiber. Thus, a flat frequency characteristic can be attained.

FIGS. 8 to 11 show an external modulator in which the elastic wave generated in the piezoelectric element section A can be efficiently converged into the core of the single mode optical fiber so that the modulation efficiency can be enhanced in the external modulator with the structure shown in FIGS. 5 to 7.

The above external modulator is similar to the structure of the external modulator shown in FIGS. 5 to 7 except that the substrate 6 is constructed with the structure which will be described later.

Figure 8:
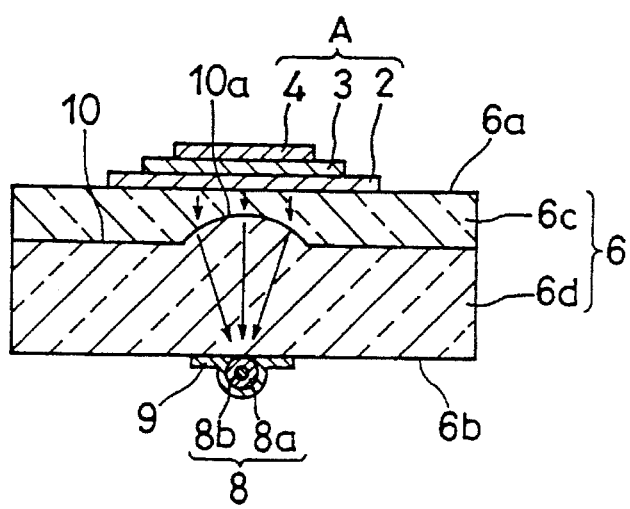
FIG. 8 is a cross sectional view showing another example of the external modulator of this invention.

That is, the substrate 6 is formed by joining two media 6c, 6d in which the propagating speeds of the elastic wave are different as shown in FIG. 8. In the junction plane 10 between the two media, the junction plane 10a between the two media lying in the position directly below the piezoelectric element section A makes a curved surface.

For example, if the medium 6c is formed of quartz glass and the medium 6d is formed of flint glass, the propagation speed of the elastic wave becomes higher in the former case than in the latter case, and in this case, the curved surface 10a becomes a curved surface which is convex towards the medium 6c side-as shown in FIG. 8.

The above substrate 6 can be manufactured by filling flint glass particles into a preset mold and pressing them into a form of the curved surface 10a, then depositing quartz glass particles on the above structure, and melting the same while raising the temperature under a high pressure.

Figure 9:
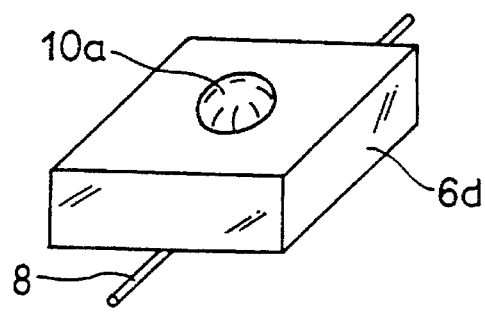
FIG. 9 is a perspective view showing an example of a medium junction surface of the external modulator of FIG. 8.
Figure 10:
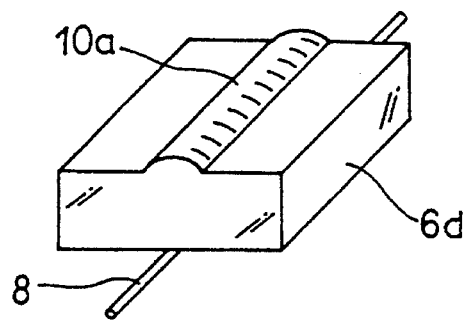
FIG. 10 is a perspective view showing another example of a medium junction surface of the external modulator of FIG. 8.

The curved surface 10a may take a form of part of the spherical surface as shown in FIG. 9 or part of a cylindrical curved surface which extends in the longitudinal direction of the single mode optical fiber 8 disposed as shown in FIG. 10. In other words, the curved surface 10a is formed according to the shape of the piezoelectric element section A.

The external modulator is operated as follows.

First, in a case where the elastic wave generated in the piezoelectric element section A is a high frequency wave of approx. 200 MHz, for example, the generated elastic wave can be regarded as a plane wave. The elastic wave traveling straightforwardly in the substrate 6 from the piezoelectric element section A is reflected or refracted on the junction plane 10a and the incident angle or refraction angle are determined by the propagation speed in the respective media 6c, 6d. As shown in FIG. 8, if the propagation speed of the elastic wave in the medium 6c is set higher than that in the medium 6d and the shape of the junction surface 10a between the two media is made to have the curved surface 10a which is convex on the medium 6c side, the elastic wave is converged towards the single mode optical fiber 8 as indicated by arrows and converged into the core 8b thereof.

Therefore, if a light is made incident on the single mode optical fiber from the D.C. light source and a voltage of a preset frequency is applied between the lower electrode 2 and the upper electrode 4, the elastic wave generated from the piezoelectric element section A is converged and concentrated towards the core 8b while propagating in the substrate 6 so that a light transmitted in the single mode optical fiber 8 can be efficiently modulated.

In the case of the above external modulator, it becomes permissible to slightly lower the precision of conversion of the elastic wave and alleviate the tolerance of the mounting precision of the single mode optical fiber by adequately setting the curvature of the junction curved surface 10a in the substrate 6.

Figure 11:
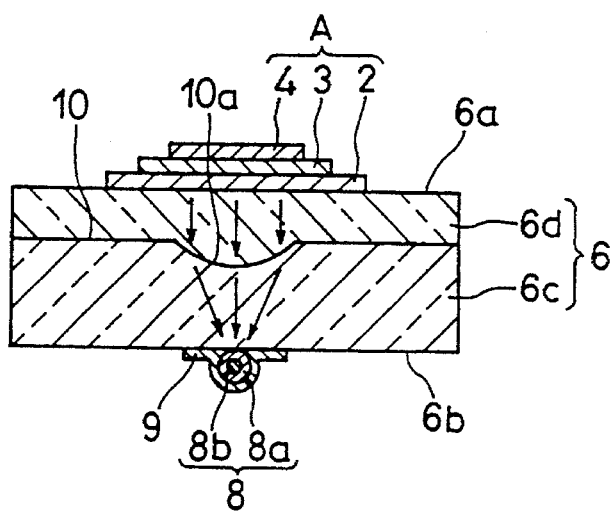
FIG. 11 is a cross sectional view showing another example of the external modulator of this invention.

FIG. 11 is a cross sectional view showing an external modulator constructed by disposing a medium 6c in which the propagation speed of the elastic wave is high on the single mode optical fiber 8 side and disposing a medium 6d in which the propagation speed of the elastic wave is low on the piezoelectric element section A side.

In this case, the junction plane 10a between the two media lying directly below the piezoelectric element section A is formed as a curved surface which is convex on the medium 6c side. As a result, it becomes possible to efficiently converge the elastic wave generated in the piezoelectric element section A into the core 8b of the single mode optical fiber 8.

Figure 12:
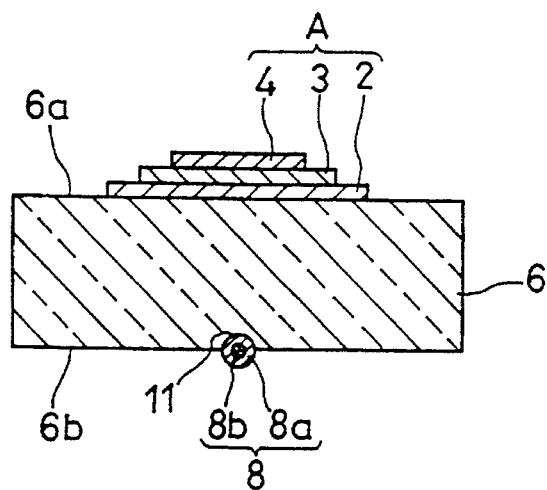
FIG. 12 is a cross sectional view showing still another example of the external modulator of this invention.

FIG. 12 is a cross sectional view of an external modulator which is another example of the external modulator of the first aspect in which the elastic wave can be efficiently converged into the core of the single mode optical fiber 8.

In the substrate 6 of the external modulator, a groove 11 extending in the arrangement direction of the single mode optical fiber disposed directly below the piezoelectric element section A in the surface 6b which is opposite to the surface 6a in which the piezoelectric element section A is formed and having a curvature slightly larger than the curvature of the single mode optical fiber 8 is formed.

The substrate 6 is formed of a medium which has an acoustic impedance which is substantially the same as the acoustic impedance of the clad layer 8a of the single mode optical fiber 8 disposed and in which the propagation speed of the elastic wave is higher than that in the single mode optical fiber 8 and, for example, it is formed of aluminum or silicon single crystal.

Further, the above-described groove 11 may be formed by known mechanical work or chemical etching.

The single mode optical fiber 8 is arranged and disposed in the groove 11. At this time, the inner peripheral surface of the groove 11 and the outer peripheral surface of the single mode optical fiber 8 are bonded together with the above-described medium which has an acoustic impedance similar to the acoustic impedance of the clad layer 8a disposed therebetween, and thus they are acoustically coupled and fixed together. In this case, "acoustically" means that the acoustic impedances of them are substantially equal to each other.

Arrangement and fixation of the single mode optical fiber 8 in the groove 11 may be attained by bonding and fixing the same on the interface with the groove 11, and it is possible to additionally cover the remaining periphery of the single mode optical fiber 8 with the above-described material as indicated in FIGS. 5 to 7. With this structure, it becomes possible to securely fix the single mode optical fiber 8 and it is preferable.

Next, the behavior of the elastic wave in the interface between the inner peripheral surface of the groove 11 and the outer peripheral surface of the single mode optical fiber 8 in the external modulator is explained.

Figure 13:
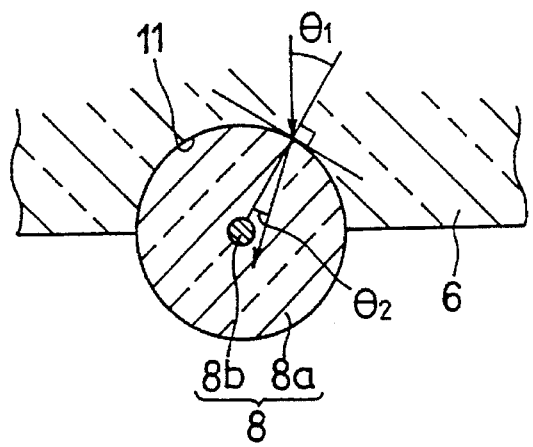
FIG. 13 is an explanatory view showing the state in which the elastic wave propagating in the substrate of the external modulator of FIG. 12 is incident on the single mode optical fiber.

FIG. 13 shows a state in which the elastic wave propagating in the substrate 6 is made incident on the single mode optical fiber 8. When the driving frequency of the elastic wave generated in the piezoelectric element section A is high, the generated elastic wave travels straightforwardly in the substrate 6, but at this time, Snell's law is valid for refraction of the elastic wave in the interface between the outer peripheral surface of the single mode optical fiber and the inner peripheral surface of the groove 11 in the same manner as in the case of light.

Figure 14:
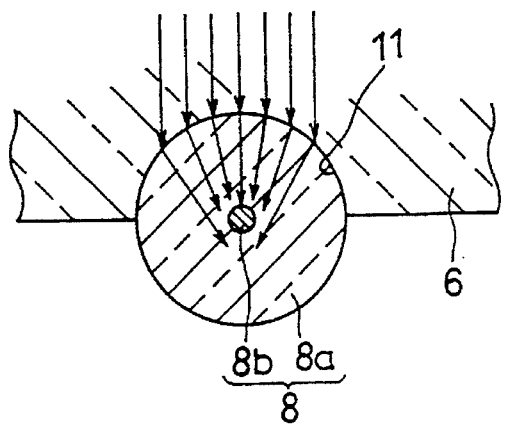
FIG. 14 is an explanatory view showing the behavior of the elastic wave in a case wherein the propagating speed of the elastic wave in the substrate of the external modulator of FIG. 12 is higher than the propagating speed of the elastic wave in the single mode optical fiber.

In this case, assuming that the propagation speed of the elastic wave propagating in the substrate 6 is $v_1$, the incident angle thereof is $\theta_1$, and the propagation speed of the elastic wave propagating in the single mode optical fiber 8 is $v_2$, and the outgoing angle thereof is $\theta_2$, then $v_1 \times \sin\theta_2 = v_2 \times \sin\theta_1$ is obtained. Therefore, when $v_1$ is larger than $v_2$, the elastic wave is converged on a portion having a curvature larger than the curvature of the single mode optical fiber 8 as indicated by arrows in FIG. 14 so that a light propagating in the core 8b of the single mode optical fiber 8 can be modulated extremely efficiently.

Figure 15:
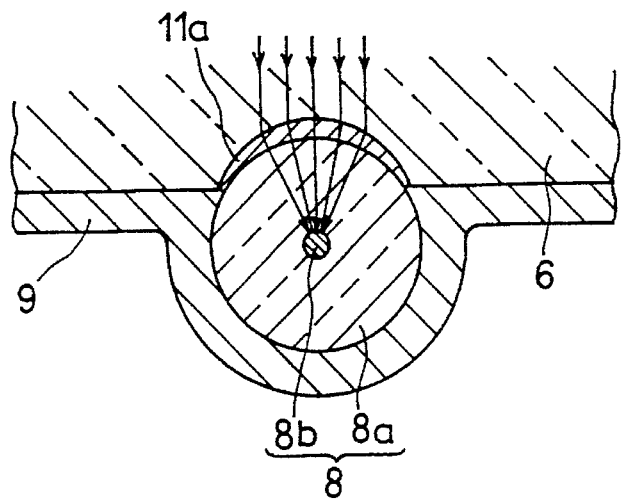
FIG. 15 is an explanatory view showing a case wherein the elastic wave causes another behavior different from that of FIG. 14.

Further, as shown in FIG. 15, the elastic wave can also be converged into the core 8b by making the shape of the groove 11 of the substrate 6 larger than the curvature of the single mode optical fiber 8, filling a space provided between the groove 11 and the single mode optical fiber 8 disposed therein with matching oil 11a or the like, and then fixing the single mode optical fiber 8 by use of the material 9.

Figure 16:
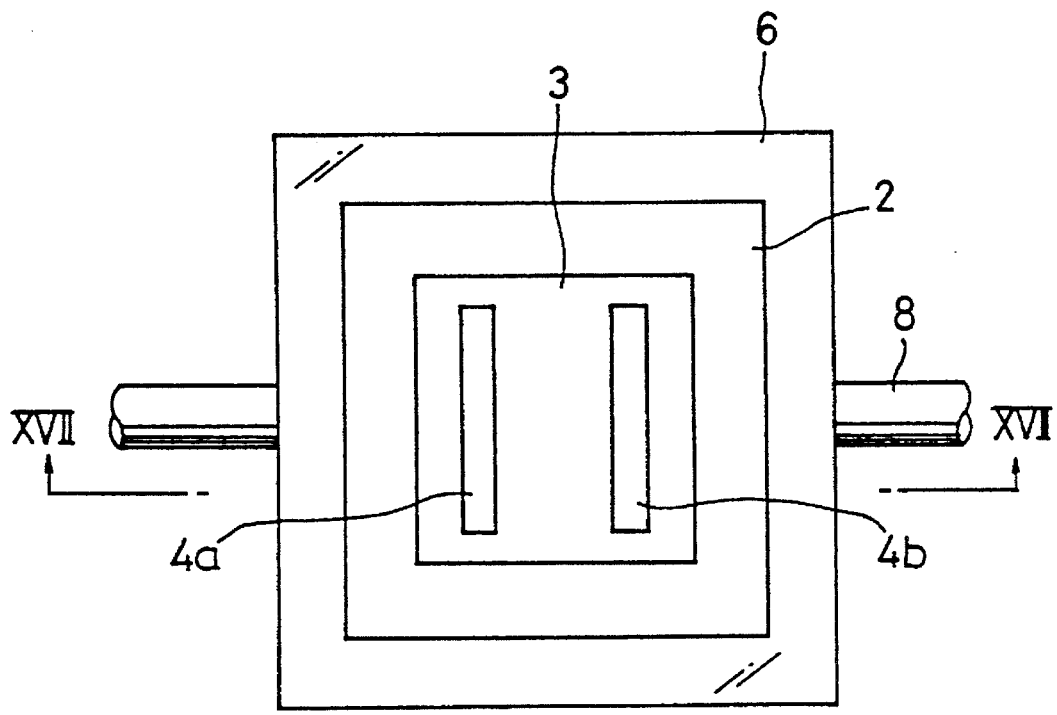
FIG. 16 is a plan view showing another example of the external modulator of this invention.
Figure 17:
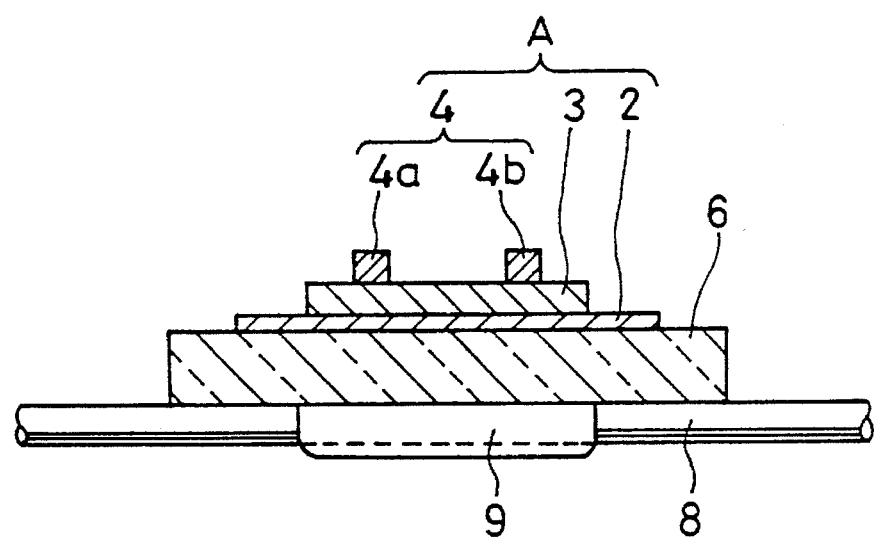
FIG. 17 is a cross sectional view taken along the line XVII—XVII of FIG. 16.

An external modulator shown in FIG. 16 and FIG. 17 which is a cross sectional view taken along the line XVII—XVII of FIG. 16 is formed by disposing a plurality of (two in the drawing) upper electrodes of the piezoelectric element section A in the case of the external modulator of the first aspect with the basic structure shown in FIGS. 5 to 7.

With the above structure, a large number (Which is the same as the number of the upper electrodes) of information items can be transmitted by use of a single external optical modulator by inputting modulation signals including different contents outputted from a modulation signal output section which is an information source to each of the upper electrodes 4a, 4b.

Further, since the frequency band in each modulation signal can be changed by adequately changing the areas of the upper electrodes 4a, 4b, a large number of information items can be transmitted by use of a single external modulator. Therefore, the occupied area of the modulation system can be made smaller in comparison with a case where a plurality of external modulators are used.

Figure 18:
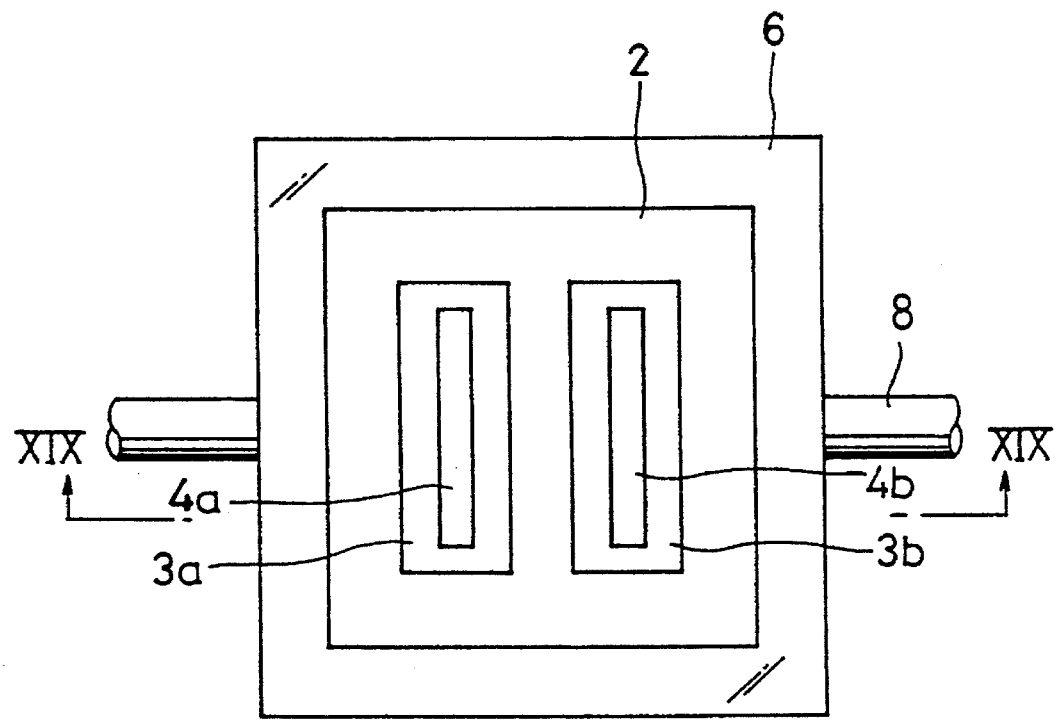
FIG. 18 is a plan view showing another example of the external modulator of this invention.
Figure 19:
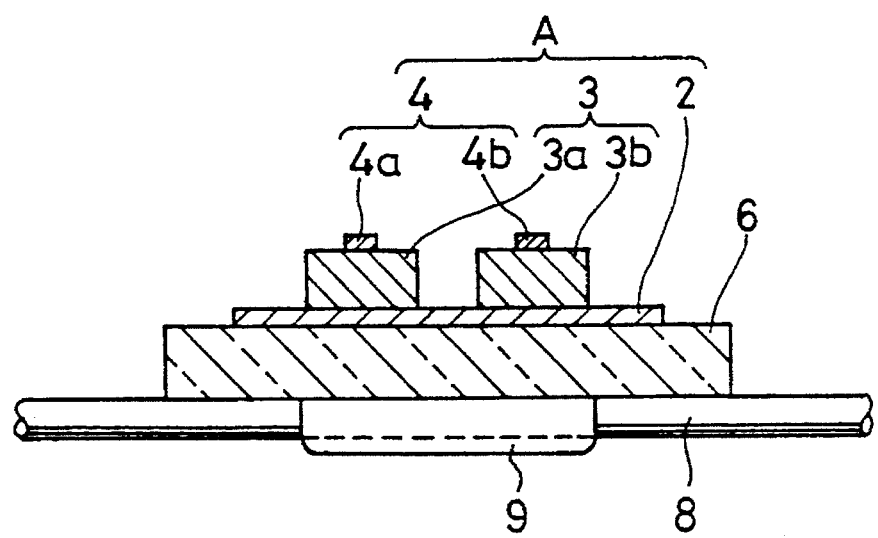
FIG. 19 is a cross sectional view taken along the line XIX—XIX of FIG. 18.

An external modulator shown in FIG. 18 and FIG. 19 which is a cross sectional view taken along the line XVX—XVX of FIG. 18 is formed by commonly disposing a lower electrode 2 in the piezoelectric element section A, forming a plurality of (two in the drawing) piezoelectric thin films 3a, 3b on the lower electrode 2, and respectively forming upper electrodes 4a, 4b on the piezoelectric thin films.

Also, with this structure, the same effect as that obtained in the external modulator shown in FIGS. 16, 17 can be attained.

Figure 20:
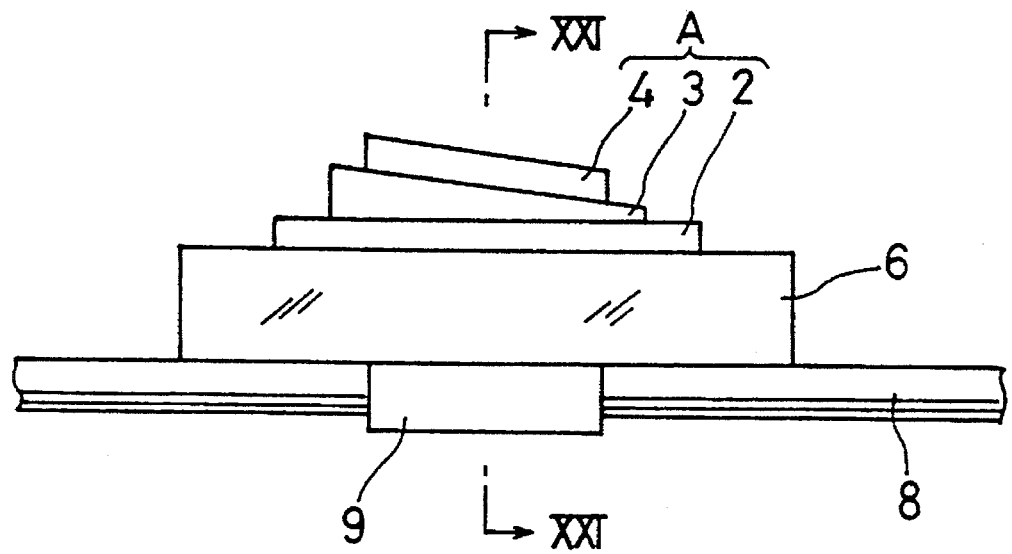
FIG. 20 is a side view showing another example of the external modulator of this invention.
Figure 21:
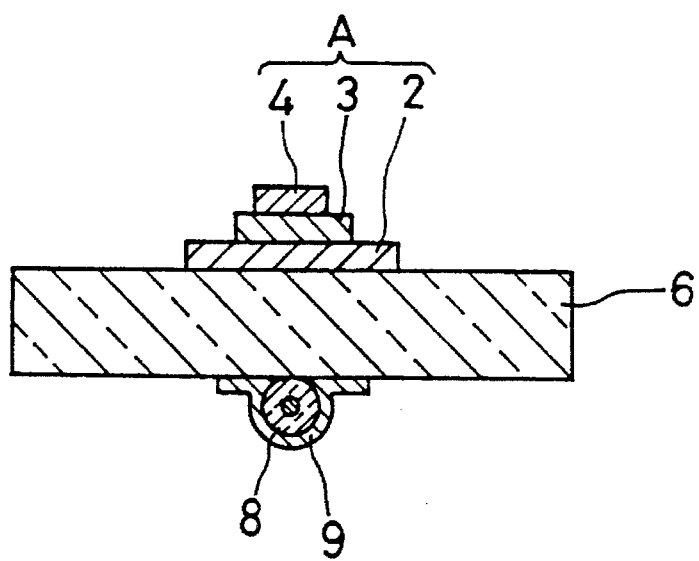
FIG. 21 is a cross sectional view taken along the line XXI—XXI of FIG. 20.

An external modulator shown in FIG. 20 and FIG. 21 which is a cross sectional view taken along the line XXI—XXI of FIG. 20 is formed by changing the film thickness of the piezoelectric thin film 3 in the piezoelectric element section A at a preset rate along the arrangement direction of the single mode optical fiber 8 in the case of the basic structure shown in FIGS. 5 to 7. That is, it is an external modulator in which a relatively inclined surface is formed between the film surface of the piezoelectric thin film 3 and the longitudinal direction of the single mode optical fiber 8.

In the case of this external modulator, it is possible to suppress the attenuation of the amplitude of the elastic wave to a small value in the frequency region of the elastic wave corresponding to the film thickness of the piezoelectric thin film 3, and as a result, the effect that the modulation frequency band width can be widened can be obtained.

In this case, the degree of a variation in the film thickness of the piezoelectric film thickness varies depending on the frequency of the wavelength of the light to be modulated, but it is preferable that the inclination of the single mode optical fiber 8 in the longitudinal direction is roughly adjusted in a range of 4.0 to $5.0 \times 10^{-4}$.

Figure 22:
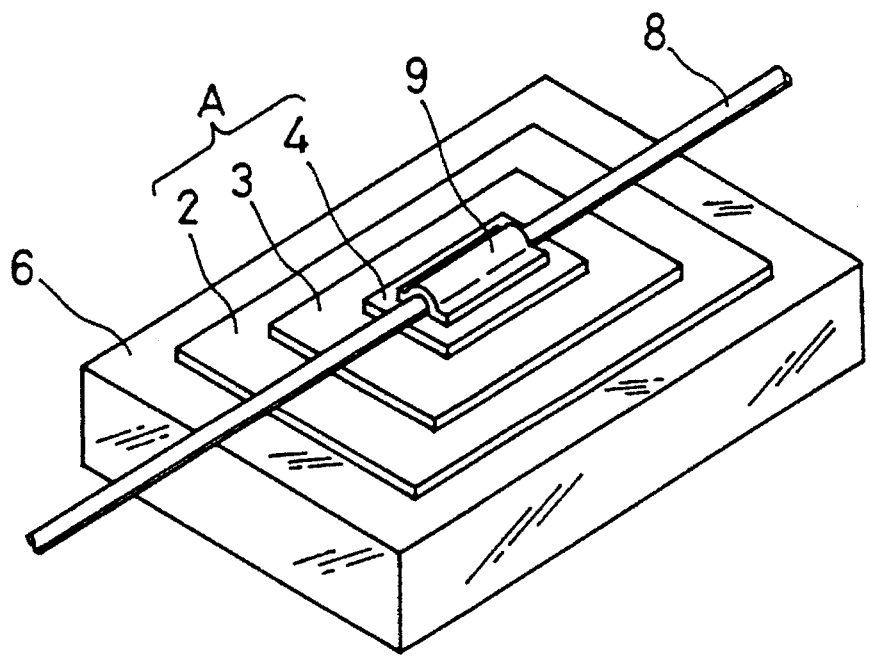
FIG. 22 is a perspective view showing another aspect of the external modulator of this invention.

Next, the second aspect in the external modulator of this invention is formed by disposing a single mode optical fiber 8 on an upper electrode 2 and coating a material 9 described before on the periphery thereof and fixing the single mode optical fiber 8 as shown in FIG. 22.

Also, in this case, like the first aspect, since the periphery of the single mode optical fiber 8 is coated with a material having substantially the same acoustic impedance as a clad layer 8a thereof, reflection of the elastic wave on the periphery of the optical fiber does not occur so that the resonance phenomenon in the optical fiber can be prevented, thereby making it possible to attain the flat frequency characteristic.

Figure 23:
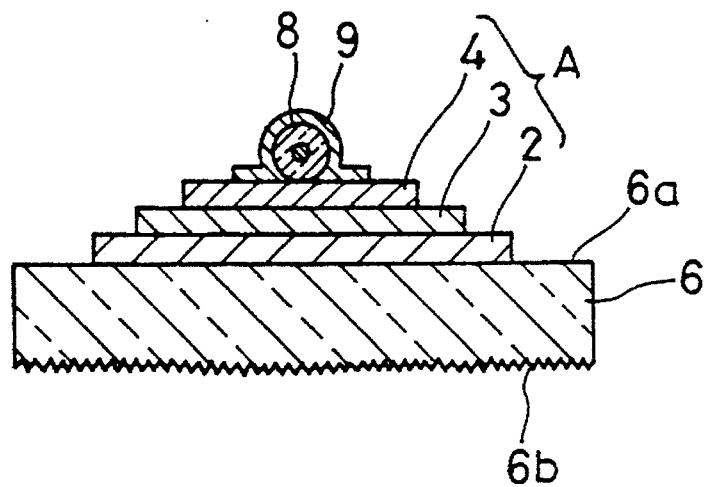
FIG. 23 is a cross sectional view showing another example of the external modulator of FIG. 22.

Further, in the external modulator with the above structure, a surface 6b which is one of the surfaces of the substrate 6 on which the piezoelectric element section A is not formed is made as a rough surface as shown in FIG. 23, the elastic wave which is part of the elastic wave generated in the piezoelectric element section A and propagates in the substrate 6 is scattered on the rough surface 6b, and as a result, the resonance of the elastic wave in the substrate 6 can be prevented and it is preferable.

In this case, it is preferable to set the roughness of the rough surface such that the center line average roughness (Ra) defined in terms of JIS B 0601 is set to be larger than the wavelength of the elastic wave propagating in the substrate. For example, in a case where the substrate is formed of quartz glass and the frequency applied to the piezoelectric element section A is 400 MHz, it is preferable to set Ra of the rough surface to 15 µm.

Such a rough surface can be obtained by polishing by use of abrasive grains having particle diameter of several tens µm, for example.

Also, in the external modulator of the above structure, as shown in FIGS. 16 to 19, a large number of information items can be transmitted by use of a single external modulator by forming a plurality of upper electrodes on the piezoelectric thin film 3 or forming a plurality of piezoelectric thin films on the lower electrode 2, respectively forming upper electrodes on them, and disposing a single mode optical fiber on each of the upper electrodes. Further, as shown in FIGS. 20, 21, it is possible to widen the modulation frequency bandwidth by making the film thickness of the piezoelectric thin film inclined at a preset rate in the longitudinal direction of the single mode optical fiber disposed.

Figure 24:
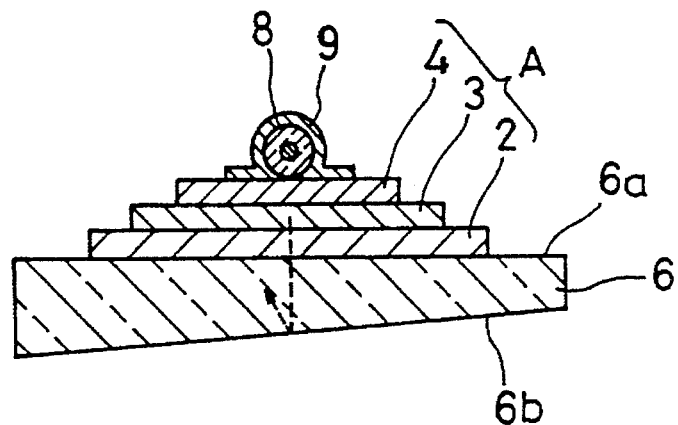
FIG. 24 is a side view showing another example of the external modulator of FIG. 22.

Further, as shown in FIG. 24, a lower electrode 2, piezoelectric thin film 3 and upper electrode 4 of uniform thickness are sequentially laminated on one surface 6a of the substrate 6 to form a piezoelectric element section A and the other surface 6b is formed to have an inclined surface which is inclined at a constant rate in a direction perpendicular to the longitudinal direction of the single mode optical fiber 8 disposed so that the elastic wave which is part of the elastic wave generated in the piezoelectric element section A and which propagates in the substrate 6 will be reflected on the inclined surface 6b as indicated by the broken lines and can be prevented from being returned in the same direction, and as a result, the resonance of the elastic wave in the substrate 6 can be prevented.

In each of the above external modulators of the first and second aspects, since the single mode optical fiber is simply bonded to and fixed on the surface of the substrate or the upper electrode, the junction may be damaged by an external force at the time of actual use.

Figure 25:
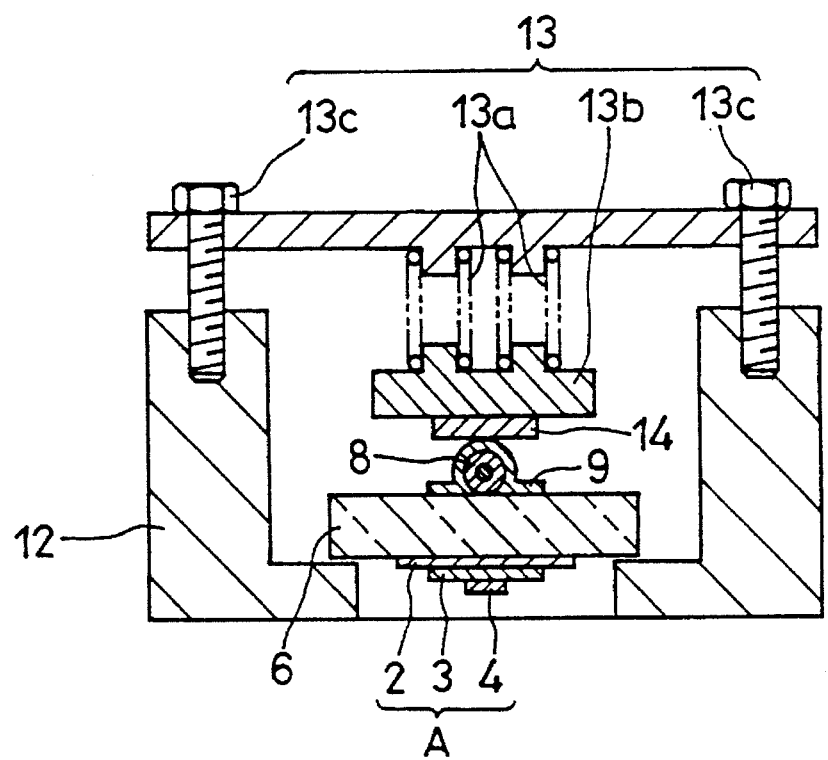
FIG. 25 is a cross sectional view showing pressing means of the external modulator of this invention.

For this reason, in the above external modulators, as shown in FIG. 25, an external modulator is disposed with the single mode optical fiber 8 side facing up on a base plate 12 of depressing means which is constructed by the base plate 12 and a depressing section 13 disposed on the upper portion of the base plate 12, having a keep plate 13b biased by springs 13a, 13a and vertically driven by adjusting screws 13c, 13c, and the single mode optical fiber 8 is resiliently depressed via a silicone rubber 14, for example, by the biasing force of the springs 13a, 13a by adjusting the screws 13c, 13c to lower the depressing section 13. With this arrangement, the single mode optical fiber can be stably held and it is suitable, and in addition, the effect that the optical fiber and the substrate are set in close contact with each other can be enhanced.

The third aspect of the external modulator of this invention is made by forming an optical transmission line directly in the substrate.

Figure 26:
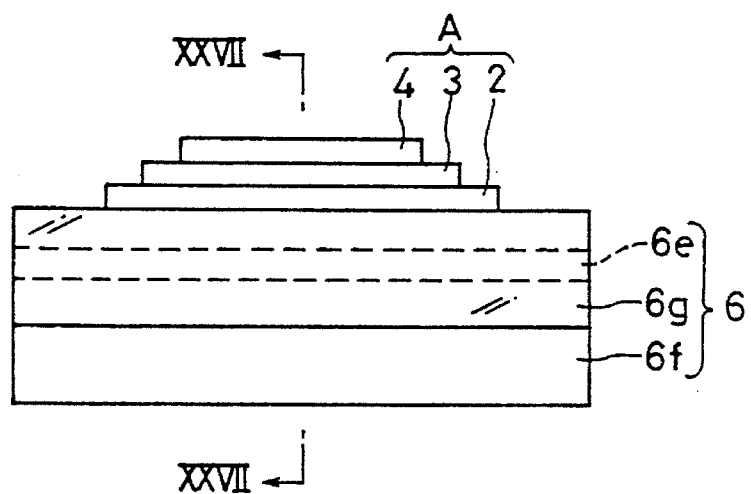
FIG. 26 is a side view showing an example of still another aspect of the external modulator of this invention.
Figure 27:
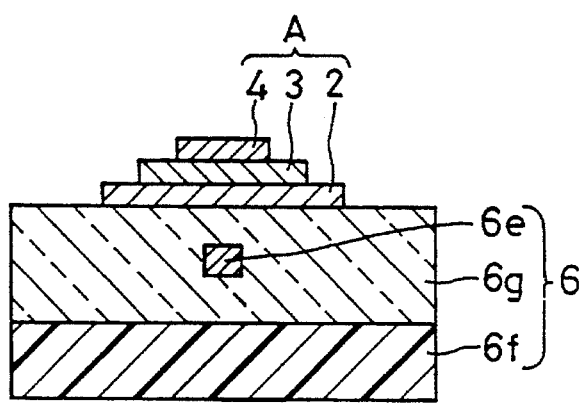
FIG. 27 is a cross sectional view taken along XXVII—XXVII of FIG. 26.

As the above external modulator, as shown in FIG. 26 and FIG. 27 which is a cross sectional view taken along the line XVX—XVX of FIG. 26, a structure in which the built-in optical transmission line is formed of an optical waveguide 6e and a piezoelectric element section A is formed on one surface of the substrate 6 may be used.

The above external modulator is manufactured by sequentially laminating a clad layer formed of quartz glass and core layer on an Si substrate 6f, for example, by the normal flame deposition method, then, removing part of the core layer by dry etching, forming the waveguide 6e of a preset cross section in the longitudinal direction, burying the waveguide 6e in a clad layer 6g as the substrate 6, and forming the piezoelectric element section A on one surface of the substrate.

With this structure, the waveguide 6e is used as the optical transmission line and a light propagating therein is modulated by an action of the piezoelectric element section A disposed directly above the same.

Figure 28:
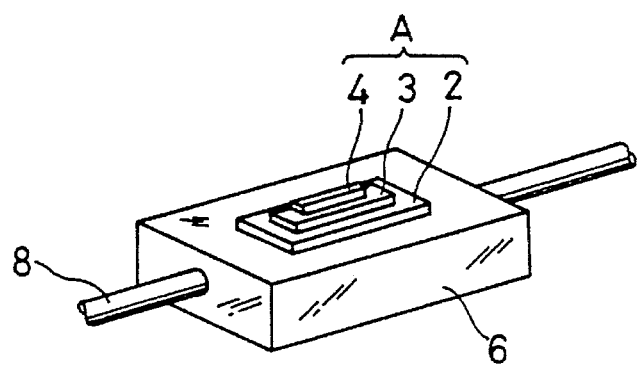
FIG. 28 is a perspective view showing another example of a still another aspect of the external modulator of this invention.

Further, as shown in FIG. 28, the single mode optical fiber 8 is integrally formed as an optical transmission line in the substrate 6 by filling a preset amount of quartz glass particles into a mold, disposing the single mode optical fiber 8 thereon, filling quartz glass particles thereon again, and vitrifying it by sintering while applying a pressure to the whole portion when forming the substrate 6 by use of quartz glass. Then, the external modulator of the third aspect can be obtained by forming the piezoelectric element section A on one surface of the substrate 6.

Also, with the external modulator of the above structure, transfer of a large number of information items can be attained by use of a single external modulator by forming a plurality of upper electrodes on the piezoelectric thin film 3 as shown in FIGS. 16 to 19, or forming a plurality of piezoelectric thin films on the lower electrode 2 and forming the upper electrodes on them, and disposing the optical transmission line in the substrate in a position corresponding to them. Further, it becomes possible to attain an increase in the modulation frequency bandwidth by setting the film thickness of the piezoelectric thin film to be inclined at a constant rate in the longitudinal direction of the built-in optical transmission line as shown in FIGS. 20, 21.

EMBODIMENTS

Embodiment 1

A lower electrode 2 was formed by sputtering Al on one surface 6a of a quartz glass plate 6 with a thickness of 1 mm, a piezoelectric thin film 3 with a thickness of 5 μm was formed by sputtering ZnO thereon, and an upper electrode was formed by sputtering Al thereon. Then, a clad layer 8a of a single mode optical fiber 8 with a core diameter of 8 μm was disposed on the other surface 6b of the quartz glass plate 6. Next, a bonding agent having quartz glass particles with grain diameter of 5 μm dispersed in sodium silicate was coated over a length of 10 mm of an arrangement portion, dried and left under the room temperature, and sintered for 2 hours at a temperature of 150° C. An optical fiber 8 was integrally formed with the quartz glass plate 6 by use of a coating 9 of sintered body of the quartz glass particles so as to form an external modulator with a structure shown in FIGS. 5 to 7.

In the above external modulator, both of the acoustic impedances of the qualtz glass plate 6 and the single mode optical fiber 8 are $13.1 \times 10^6$ kg/(m².s) and the acoustic impedance of the coating 9 also has substantially the same value.

100 external modulators were serially connected by connecting the end portions of the optical fibers of the external modulators by thermal fusion, one end thereof was connected to a light source, and the other end was connected to a receiving section.

An LD for emitting a light with wavelength of 1.33 nm was used as the light source and the LD was caused to emit a light at a constant intensity so as to make the light incident on the single mode optical fiber. Further, the receiving section was constructed to have a polarization element connected to the single mode optical fiber and measure a change in the intensity of light received at a PD (Photodiode) after passing through the polarization element.

In this optical communication system, the loss of light by one external modulator is caused only by the connection loss caused by fusing the single mode optical fibers to each other and was approx. 0.03 dB. Therefore, the total loss of the 100 external modulators was approx. 3.0 dB.

When a sine wave of 400 MHz to 500 MHz was transmitted to each of the external modulators at an interval of 1 MHz and all the signals obtained at this time were measured at the receiving section, all of the signals could be simultaneously detected.

Embodiment 2

In the external modulator shown in FIG. 8, a piezoelectric element section A was formed in the same manner as in the case of the embodiment 1 except that quartz glass was used as the medium 6d, flint glass was used as the medium 6c, the total thickness of the substrate was set to 2 mm, the radius of curvature of the curved surface 10a was set to 1.25 mm, and the height thereof was set to 0.5 mm, and the single mode optical fiber was disposed in the same manner as in the case of the embodiment 1.

Figure 29:
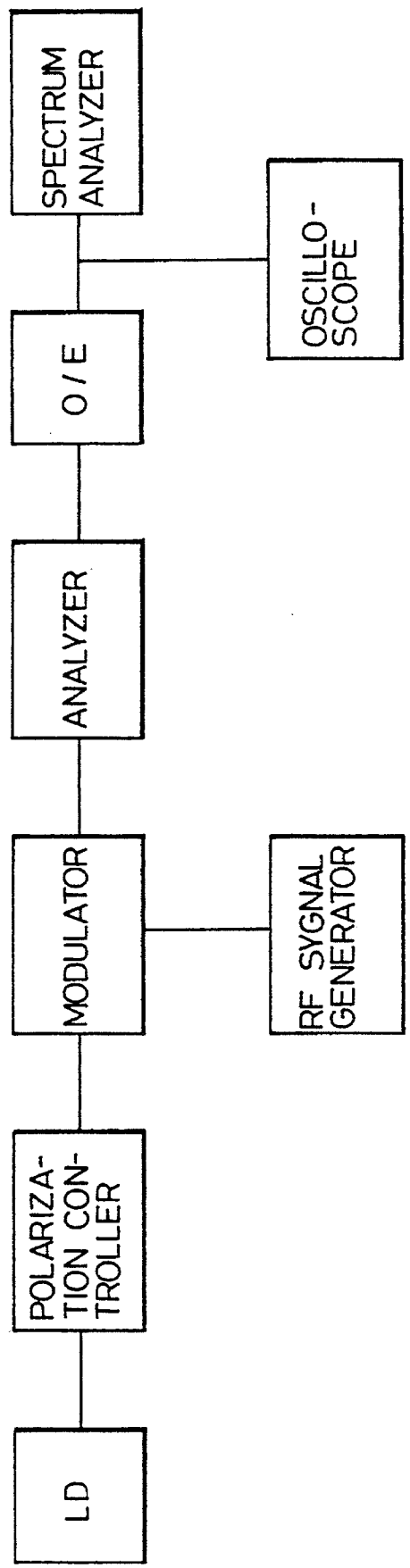
FIG. 29 is a block diagram showing a measurement system for modulated output of the external modulator.

The above external modulator was set in the measurement system shown in FIG. 29 and an modulated output thereof for a light having a wavelength of 1.33 nm was measured. A modulation output improved by 12 dB or more in comparison with a case wherein the entire portion of the substrate 6 was formed of quartz glass was measured.

Embodiment 3

An external modulator with the structure shown in FIG. 12 was formed by forming the substrate 6 by use of Al, forming the piezoelectric element section A having the lower electrode 2 and upper electrode 4 formed with a thickness of 0.2 μm by use of Cr and Au, respectively, and the piezoelectric thin film 3 formed with a thickness of 7 μm by use of ZnO on one surface of the substrate, forming a groove 11 having a semi-circular cross section and a diameter of 126 mm on the other surface thereof, setting the single mode optical fiber 8 with a diameter of 125 mm into the groove, bonding them together by use of the same bonding agent used in the embodiment 1, and then bonding and fixing them by sintering.

The external modulator was set in the measurement system shown in FIG. 29 and a high-frequency voltage of approx. 200 MHz was applied between the lower electrode 2 and the upper electrode 4 to measure a modulation output for a light having a wavelength of 1.33 nm.

It was confirmed that a modulation output was improved by 10 dB or more in comparison with an external modulator constructed by using a quartz glass plate having the same propagation speed of the elastic wave as the optical fiber as a substrate and forming a similar groove.

Embodiment 4

Figure 30:
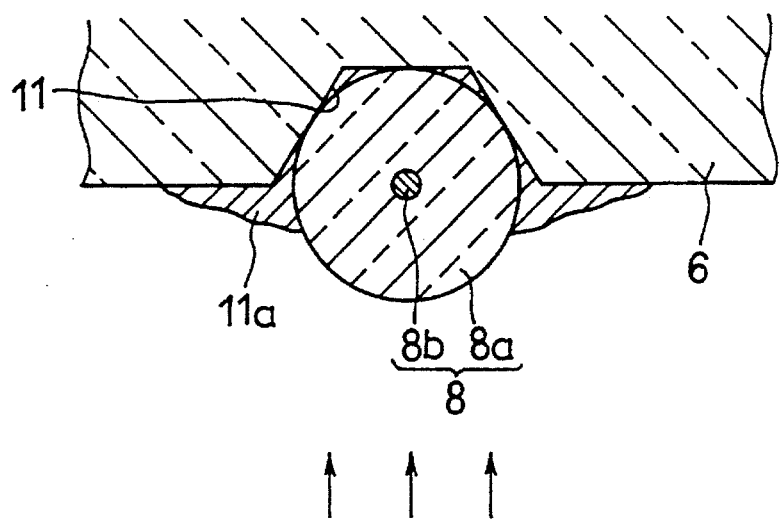
FIG. 30 is a cross sectional view showing the fixing state of the single mode optical fiber into a groove in the case of an embodiment 4 of this invention.

A silicon single crystal substrate was prepared as the substrate 6, an etching mask was formed on one surface thereof by use of $SiO_2$, and then an etching process was effected by use of potassium hydroxide solution to form a groove 11 with a cross section as shown in FIG. 30. Next, an external modulator with a structure shown in FIG. 30 was formed by filling matching oil 11a into the groove 11, disposing a single mode optical fiber 8 therein, and pressing the optical fiber towards the substrate 6 side as indicated by arrows so as to fix the same in the groove. When an modulation output was measured under the same condition as that of the embodiment 3 by use of this external modulator, it was confirmed that the elastic wave generated in the piezoelectric element section A was efficiently converged into the core 8b of the single mode optical fiber 8.

Embodiment 5

A quartz glass plate with the length of 20 mm, width of 20 mm and thickness of 1 mm was prepared as a substrate.

External modulators with a structure shown in FIGS. 16, 17 were formed by forming a lower electrode with a thickness of approx. 0.2 µm by vapor-depositing Al on one surface of the quartz glass plate, forming a piezoelectric thin film of ZnO with a thickness of approx. 10 µm on the above structure by the sputtering method, and then vapor-depositing Al thereon to form two strip-form upper electrodes with a width of 0.4 µm, length of 1 mm and thickness of 0.2 µm so as to form a piezoelectric element section A.

A signal with a central frequency of 320 MHz and bandwidth of 1 MHz is applied to one of the external modulators and a signal with a central frequency of 340 MHz and bandwidth of 4 MHz is applied to the other external modulator so as to drive the piezoelectric thin film 3.

When a signal intensity-modulated by supplying it through an analyzer in the measurement system of FIG. 29 was observed by passing the O/E converter and by use of a spectrum analyzer, it was confirmed that the two signals ware correctly transmitted.

Embodiment 6

An external modulator with a structure shown in FIGS. 20, 21 was manufactured as described below.

First, a quartz glass plate with the length of 20 mm, width of 20 mm and thickness of 1 mm was prepared as the substrate 6, the lower electrode 2 with a thickness of approx. 0.2 µm was formed by vapor depositing Al on one surface thereof, and a piezoelectric thin film was formed on the structure by sputtering ZnO in a strip form with a width of approx. 10 µm and a length of approx. 10 mm. Further, the upper surface of the piezoelectric thin film 3 is made as an inclined surface having an inclination of approx. $2 \times 10^{-3}$ in the longitudinal direction.

Next, the upper electrode 4 was formed in a strip form with a width of 1 mm and a length 10 mm by vapor depositing Al on the piezoelectric thin film 3.

After this, like the embodiment 1, the single mode optical fiber 3 was disposed in position directly below the upper electrode 4 on the other surface of the substrate.

The external modulator was set in the measurement system shown in FIG. 29 .and evaluation for the frequency characteristic was made by use of a light with a wavelength of 1.33 nm.

Figure 31:
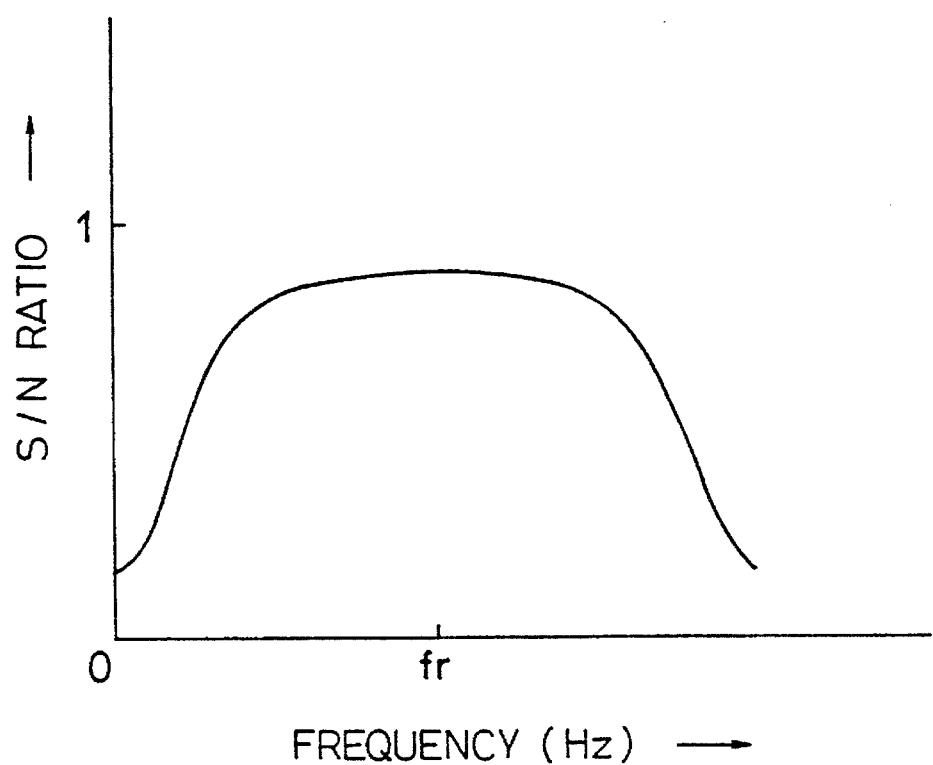
FIG. 31 is a graph showing the frequency characteristic of an external modulator of an embodiment 6.

The result is shown in FIG. 31.

As is clearly seen from FIG. 31, in this external modulator, attenuation of the elastic wave in the frequency region corresponding to the film thickness of the piezoelectric thin film 3 is small, and an increase in the modulation frequency bandwidth is realized.

Embodiment 7

An external modulator with the structure shown in FIG. 22 was formed.

That is, like the embodiment 1, the piezoelectric element section A was formed on one surface of the substrate of the quartz glass plate and the single mode optical fiber 8 was disposed and fixed on the upper electrode 4 of the piezoelectric element section A by use of the bonding agent used in the embodiment 1.

The external modulators were serially connected in the same manner as in the embodiment 1 and the same experiment was made. As a result, the total loss of 100 external modulators was approx. 4.8 dB and all of the modulation signals of 400 to 500 MHz could be simultaneously detected.

Embodiment 8

An external modulator with the structure shown in FIG. 23 was formed by polishing one surface of the substrate of the embodiment 7 on which the piezoelectric element section A was not formed by use of abrasive grains with a grain diameter of 40 µm to make a rough surface with the surface roughness of 6.8 µm in terms of Ra.

When the same experiment as in the embodiment 7 was made, resonance of the elastic wave in the substrate was prevented and the frequency band was improved by 6 MHz in comparison with a case of the external modulator of the embodiment 7.

Embodiment 9

An external modulator with the structure shown in FIG. 24 was formed by forming one surface of the substrate of the embodiment 7 on which the piezoelectric element section A was not formed into a surface which is inclined with the inclination of 10° with respect to a direction perpendicular to the longitudinal direction of the single mode optical fiber 8.

When the same experiment as in the embodiment 7 was made, resonance of the elastic wave in the substrate was prevented and the frequency band was improved by 3 MHz in comparison with a case of the external modulator of the embodiment 7.

Embodiment 10

An external modulator with the structure shown in FIGS. 26, 27 was formed as follows.

A slab-form clad layer and a slab-form core layer were formed by sequentially depositing quartz glass fine particles which would make a clad layer and a core layer on an Si substrate 6f with a diameter of 76.2 mm (3 inches) and a thickness of 1 mm by the flame deposition method and then sintering and vitrifying the same at 1100° C.

Next, the core layer was subjected to the dry etching to form a waveguide 6e of a cross section with a width of 8 µm and a height of 8 µm along the longitudinal direction, and then, quartz glass fine particles which would make a clad layer were deposited and vitrified on the waveguide so as to form a substrate which has the waveguide 6e buried in the clad layer 6g and whose thickness is 50 µm except the Si substrate 6f.

Then, like the embodiment 1, the lower electrode 2, piezoelectric thin film 3 and upper electrode 4 are sequentially laminated on the clad layer 6g to form the piezoelectric element section A.

Next, optical fibers whose end faces were polished were abut against both ends of the waveguide 6e to form an optical transmission line. When the measurement for the external modulator was made in the same manner as in the embodiment 1, the frequency band was improved by 7 MHz or more in comparison with a case of the external modulator of the embodiment 7.

Embodiment 11

An external modulator with the structure shown in FIG. 28 was formed as follows.

Quartz glass particles with a grain diameter of 3 to 5 μm were filled to approximately the half depth of a mold with a depth of 1.3 mm, length of 20 mm and width of 20 mm, then single mode quartz glass optical fiber with an outer diameter of 125 μm was disposed thereon, and quartz glass particles were filled again into the mold.

A pressure of 1000 kg/cm² was applied towards the thickness direction under the normal temperature and a base plate which is 1.2 mm in thickness and 20 mm in length and width and has the optical fiber disposed near the center of the thickness direction was obtained. It was sintered at a temperature of 1300° C. under the normal pressure so as to integrally form the single mode optical fiber 8 in the substrate with a length and width of 20 mm and thickness of 1.0 mm.

Like the embodiment 1, the lower electrode 2, piezoelectric thin film 3 and upper electrode 4 were sequentially laminated on the substrate 6 so as to form the piezoelectric element section A.

The same experiment as that of the embodiment 10 for the above external modulator and substantially the same result was obtained.

Industrial Applicability

An external modulator of this invention has a small insertion loss and a flat frequency characteristic, can be used for high-frequency modulation, can transmit a large number of information items, may permit the resonance of the elastic wave in the optical fiber to be suppressed, may permit the elastic wave to be efficiently converged into the optical fiber, and can be easily manufactured so that it can be effectively used as an external modulator for optical communication.

We claim:

1. An external modulator for optical communication comprising:

a substantially flat substrate having substantially the same acoustic impedance as a clad layer of a single mode optical fiber to be disposed thereon, said substrate having two surfaces;

a piezoelectric element section comprising a laminated structure of a lower electrode, a piezoelectric thin film and an upper electrode laminated in this order on one of said surfaces of said substrate;

at least one single mode optical fiber arranged on the other of said surfaces of said substrate, said optical fiber on said substrate having a clad layer thereon; and a material coating said single mode optical fiber on at least part thereof in a place in which said single mode optical fiber is disposed, and said material having an acoustic impedance which is approximately equal to that of said clad layer of said single mode optional fiber.

2. An external modulator for optical communication according to claim 1, wherein:

said substrate comprises a plurality of joined media in which the propagation speeds of an elastic wave are different, said joined media being joined at a junction surface; and the junction surface of said substrate is formed to have a curved surface for converging the elastic wave emitted from said piezoelectric element section towards said single mode optical fiber.

3. An external modulator for optical communication according to claim 1, wherein:

said substrate has a groove formed on said other surface on said substrate for receiving therein a single mode optical fiber to be disposed on said substrate; and said substrate is formed of a medium in which the propagation speed of an elastic wave propagating in said medium of said substrate is higher than the propagation speed of an elastic wave in said single mode optical fiber.

4. An external modulator for optical communication according to claim 1, wherein said material coating said single mode optical fiber is ceramics.

5. An external modulator for optical communication according to claim 1, wherein a plurality of said upper electrodes are disposed on said piezoelectric thin film.

6. An external modulator for optical communication according to claim 1, wherein said piezoelectric thin film has a film thickness which changes at a constant rate in the longitudinal direction of said single mode optical fiber.

7. An external modulator for optical communication according to claim 1, further comprising means for resiliently pressing said substrate and said single mode optical fiber against each other.

8. An external modulator for optical communication comprising:

a substantially flat substrate having substantially the same acoustic impedance as a clad layer of a single mode optical fiber to be disposed thereon, said substrate having two surfaces;

a piezoelectric element section comprising a laminated structure of a lower electrode, a piezoelectric thin film and an upper electrode laminated in this order on one of said surface of said substrate;

at least one single mode optical fiber arranged on said upper electrode, said optical fiber on said upper electrode having a clad layer thereon; and a material coating said single mode optical fiber on at least part thereof in a place in which said single mode optical fiber is disposed, and said material having an acoustic impedance which is approximately equal to that of said clad layer of said single mode optical fiber.

9. An external modulator for optical communication according to claim 8, wherein said material coating said single mode optical fiber is ceramics.

10. An external modulator for optical communication according to claim 8, wherein a plurality of said upper electrodes are disposed on said piezoelectric thin film.

11. An external modulator for optical communication according to claim 8, wherein the other of said surfaces of said substrate is made as a rough surface.

12. An external modulator for optical communication according to claim 1, wherein both of said two surfaces of said substrate are substantially flat.

13. An external modulator for optical communication according to claim 1, wherein said one of said surfaces of said substrate is substantially flat.

14. An external modulator for optical communication according to claim 1, wherein said material coats substantially all of the periphery of said part of said optical fiber except for a portion of said optical fiber which is in contact with said substrate.

15. An external modulator for optical communication according to claim 8, wherein said material coats substantially all of the periphery of said part of said optical fiber except for a portion of said optical fiber which is in contact with said upper electrode.

16. An external modulator for optical communication according to claim 8, wherein said one of said surfaces of said substrate is substantially flat.

* * * * *